United States Patent [19]

Toyoda et al.

[11] Patent Number: 4,504,837

[45] Date of Patent: Mar. 12, 1985

[54] METHOD AND APPARATUS FOR RECORDING COLOR IMAGES AS COLOR TRANSFER SUPERIMPOSED LAMINATIONS

[75] Inventors: Kenji Toyoda, Chigasaki; Kaoru Naito, Yokohama; Norio Yamamura, Kawasaki, all of Japan

[73] Assignee: Nippon Kogaku K.K., Tokyo, Japan

[21] Appl. No.: 395,241

[22] Filed: Jul. 6, 1982

[30] Foreign Application Priority Data

Jul. 14, 1981 [JP] Japan ............................... 56-109862
Oct. 28, 1981 [JP] Japan ............................... 56-172426

[51] Int. Cl.$^3$ ........................ G01D 15/16; B44C 1/16; B32B 7/14; G01D 15/10

[52] U.S. Cl. ........................................ 346/1.1; 346/46; 346/76 PH; 156/240; 156/277; 428/204

[58] Field of Search ........................ 156/240, 277, 555; 101/420; 428/204, DIG. 13; 346/76 PH, 136, 46, 1.1

[56] References Cited

U.S. PATENT DOCUMENTS

| | | | |
|---|---|---|---|
| 3,681,105 | 8/1972 | Milutin et al. | 156/277 X |
| 3,751,318 | 8/1973 | Newman | 156/277 X |
| 3,984,809 | 10/1976 | Dertouzos et al. | 346/139 C X |
| 4,035,214 | 7/1977 | Shuppert et al. | 156/277 X |
| 4,063,641 | 12/1977 | Kuehn et al. | 156/277 X |
| 4,234,644 | 11/1980 | Blake et al. | 428/204 |
| 4,250,511 | 2/1981 | Stein et al. | 346/76 PH |
| 4,370,370 | 1/1983 | Iwata et al. | 428/204 X |
| 4,410,898 | 10/1983 | Murayama et al. | 346/76 PH |

FOREIGN PATENT DOCUMENTS

| | | |
|---|---|---|
| 69904 | 6/1978 | Japan . |
| 155820 | 12/1978 | Japan . |

*Primary Examiner*—E. A. Goldberg
*Assistant Examiner*—Gerald E. Preston
*Attorney, Agent, or Firm*—Shapiro and Shapiro

[57] ABSTRACT

A recording method comprises the steps of selectively applying heat to individual heat sensitive color forming sheets each comprising a supporting sheet and a transparent color forming layer on the supporting sheet, which color forming layer is adhesive and develops a color under the action of heat but the colors developed in the individual layers being different from each other, thereby forming monochromic images in different colors on the individual color forming sheets; and separating each color forming layer with the formed monochromic image from the corrresponding supporting sheet and laying the separated individual layers on a common base sheet successively in layers making use of their own adhesiveness.

8 Claims, 9 Drawing Figures

METHOD AND APPARATUS FOR RECORDING COLOR IMAGES AS COLOR TRANSFER SUPERIMPOSED LAMINATIONS

BACKGROUND OF THE INVENTION

1. Field of the Invention

The present invention relates to a method and apparatus for recording images and, more particularly, to such image recording method and apparatus which enable recording of an image on sheet material in such manner as to protect the recorded images against the degradation of image quality by dirt, for example.

2. Description of the Prior Art

In the art, various recording methods have been proposed to record images on sheet material. Among them, a thermal recording method has been widely admitted to be advantageous in respect of reliability and operability. Japanese Patent Application laid open Nos. 161946/1979 and 82676/1980 have disclosed a recording apparatus based on the principle of the thermal transfer recording method. With the recording apparatus, a common uncoated paper can be used as the recording medium. Furthermore, there are obtained recorded images having improved resolution. In this known apparatus, an image is recorded through two transfer steps, an intermediate transfer step and a final transfer step. At the intermediate transfer step, the surface of an intermediate transfer film is brought into contact with a portion of the solid ink layer of a transfer master. While keeping the contact, the ink layer is selectively heated by means of a heating element from the backside of the film so as to transfer an ink image onto the film. At the final transfer step, the ink image is transferred onto a sheet of common paper from the film.

Since the ink is heated through an intermediate transfer film, the amount of ink transferred onto the film is maintained nearly constant even when the solid ink layer on the transfer master has some irregularity in layer thickness. Therefore, there are obtained images of high resolution. This is an important advantage of the thermal transfer recording system mentioned above. Another advantage of the recording system is that as the recording medium there may be used not only any common papers but also any other media optionally selected.

The above image recording process comprising the steps of forming an image on an intermediate transfer film at first and then transferring the image onto a recording paper from the film may be applied to various recording systems other than the above described thermal recording system by suitably modifying the method of forming images on the intermediate transfer film.

However, in any case, the known image recording method involves some problems. Firstly, a periodical exchange of the intermediate transfer film is required because it is worn and damaged in use. Time and labour consumed for such maintenance work are by no means small. Secondly, it is difficult to increase the efficiency of image transfer from the intermediate transfer to the final recording material. There has not yet been proposed any effective solution to this problem.

The thermal recording method is a good method also for recording multi-color images or natural color images on sheet material. However, when sharp and clear color images are desired, the method according to the prior art is not satisfactory.

SUMMARY OF THE INVENTION

Accordingly it is the primary object of the invention to provide an image recording method and apparatus which eliminates the problem of low transfer efficiency caused by the presence of an intermediate transfer film.

It is another object of the invention to provide an image recording method and apparatus which provides images of improved durability recorded on sheet material.

To attain the above objects according to the invention there is provided a recording method comprising the steps of forming an image on one surface of a film and and binding the film itself to a base sheet on the side of the surface on which the image has been formed. In the record obtained according to the method of the invention, the recorded image is present in the state sandwiched in between the base sheet and the film. The image former is never exposed to the air. The durability and weather resistance of the recorded image are remarkably improved. The film having the image former adhered thereto constitutes a part of the final record. Therefore, maintenance of the film is no longer necessary.

It is a further object of the invention to provide a recording method and apparatus which permits recording of multi-color or natural color images with high sharpness and with the advantage of easy handling while employing the thermal recording process.

To attain the objects accroding to one embodiment of the invention, there is provided a recording method comprising the steps of selectively applying heat to individual heat sensitive color forming sheets each comprising a supporting sheet and a transparent color forming layer on the supporting sheet, which color forming layer is adhesive and develops a color under the action of heat but the colors developed in the individual layers being different from each other, thereby forming monochromic images in different colors on the individual color forming sheets; and separating each color forming layer with the formed monochromic image from the corresponding supporting sheet and laying the separated individual layers on a common base sheet successively in layers making use of their own adhesiveness.

Other and further objects, features and advantages of the invention will appear more fully from the following description of preferred embodiments taken in connection with the accompanying drawings.

DESCRIPTION OF PREFERRED EMBODIMENTS

Figure 1:
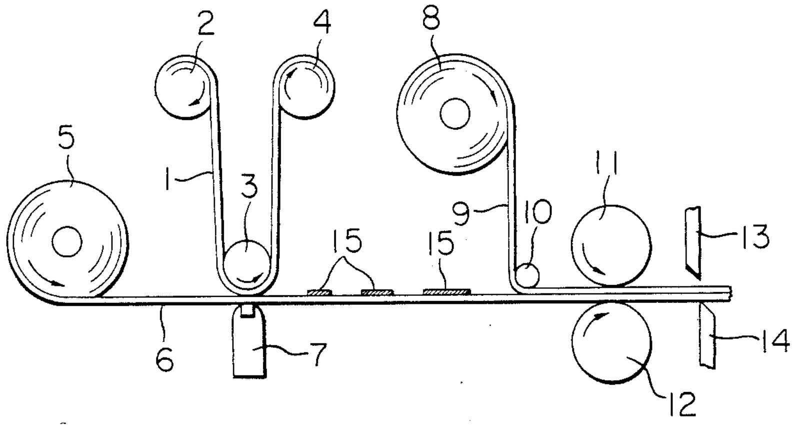
FIG. 1 is a schematic view showing a first embodiment of the invention.

Referring to FIG. 1 showing the first embodiment of the invention, 1 is an ink ribbon composed of a plastic film in the form of web and a solid ink layer coated on the film. The ink ribbon 1 is supplied from a ribbon supply drum 2 and taken up by a take-up drum 4 after passing about a roller 3. The ink ribbon 1 passes around the roller 3 with the ink coated surface outward.

Supplied from a film supply drum 5 is a transparent plastic film 6 which is in the form of a very thin web. At the position of the roller 3, the plastic film 6 comes into contact with the ink coated surface of the ink ribbon 1. A preferred example of the film 6 is a film of polyethyleneterephthalate about 10 μm thick.

7 is a thermal head disposed opposed to the roller 3 through the ink ribbon 1 and the film 6 therebetween. The ink ribbon 1, the supply and take-up rollers 2 and 4, the roller 3 and the thermal head 7 constitute together a recording part of the apparatus.

8 is a base sheet supply drum from which a base sheet 9 is supplied. The base sheet 9 is a white and opaque paper or plastic sheet in the form of web. At the position of a roller 10, the base sheet 9 is laid on the film 6 and then it passes between a pair of pressing rollers 11 and 12. The paired pressing rollers 11, 12 contain a heat source therein. A pair of cutters 13 and 14 are disposed behind the pressing rollers 11 and 12 respectively.

The film 6 is fed from the supply drum 5 at a constant speed and is selectively heated by the thermal head 7 while running in contact with the ink coated surface of the ink ribbon 1. The heat from the thermal head 7 is applied to the ink layer on the ribbon 1 through the film 6. An amount of ink corresponding to the heat applied from the thermal head is melted thereby and the melted ink adheres to the surface of the film 6. In this manner, an ink image as indicated by 15 is formed on the film 6. The density of the ink image may be controlled by controlling the amount of heat generated from the thermal head, thereby controlling the amount of ink to be adhered to the film 6. The control of the amount of heat from the thermal head 7 is attained by controlling the driving current to the head. Therefore, it is possible to form the ink image as a halftone image by suitably controlling the level of the driving current to the thermal head.

The running of the film 6 may be intermittent at least in the area of the thermal head 7 while applying to the thermal head a pulsating driving current in synchronism with the intermittent running of the film. In this case also it is possible to obtain a halftone ink image by suitably changing the pulse width of the above pulsating driving current, namely changing the pulse duty, thereby controlling the amount of heat from the thermal head 7.

The film 6 having the ink image 15 formed thereon comes to the position of the roller 10 where the image bearing surface of the film 6 is overlaid with the base sheet 9. The film 6 and the base sheet 9 together pass between the heated pressing rollers 11 and 12 by which the film 6 is bonded to the base sheet 9 in the manner of heat and pressure bonding. To perform the bonding more easily and surely it is advisable that a plastic coating layer be previously applied to the surface of the base sheet 9. To carry out the bonding there may also be used other methods than the shown heat and pressure bonding. For example, any suitable adhesives or binders may be used.

The base sheet 9 and the film 6 thus bonded together are cut by the cutters 13 and 14 to obtain a desired hard copy. The hard copy thus obtained has a sufficient strength and stiffness for handling because of its base sheet 9. In the hard copy, the ink image is between the film 6 and the base sheet 9 and not exposed to the air. Therefore, the image is protected against dirt and other deteriorating matters. It has excellent durability and weather resistance.

Figure 2:
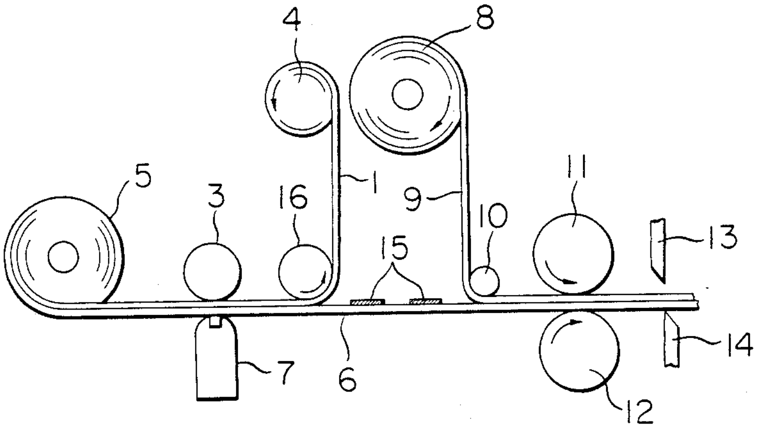
FIGS. 2 and 3 show modifications of the first embodiment respectively.

FIG. 2 shows a modification of the above first embodiment.

In this modification, the film 6 and the ink ribbon 1 are previously laid one on the other and in the overlapped state they are wound around the supply drum 5. The overlapped film and ink ribbon are fed together from the supply drum 5 and pass between the roller 3 and the thermal head 7 where an ink image is formed in the same manner as the above. After the ink image has been formed on the film 6, the ink ribbon 1 is separated from the film at the position of a roller 16. The separated ink ribbon 1 is taken up around the take-up drum 4. Other parts of the modification correspond to those of the above first embodiment and need not be further described.

Figure 3:
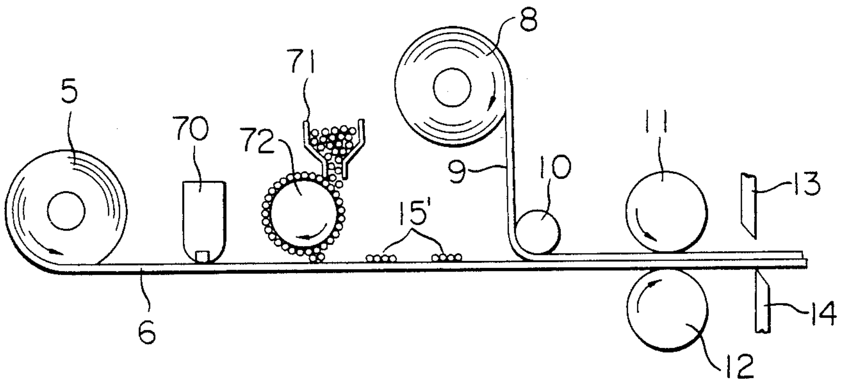

FIG. 3 shows another modification of the first embodiment.

In this embodiment, the thermal recording part 1, 2, 3, 4, 7 is replaced by an electrostatic recording part. The electrostatic recording part is constituted of an electrostatic recording head 70, a hopper 71 and a toner supply drum 72. Other parts of the apparatus correspond to those of the first embodiment shown in FIG. 1. The electrostatic head 70 applies to the film 6 electric charges to form a latent image thereon. Toner is fed to the toner supply drum 72 from the hopper 71. The toner is charged with the opposite polarity to that of the latent image. The toner applied onto the film 6 by the toner supply drum 72 adheres to the latent image to develop it. The film 6 having the toner image 15' thereon is overlaid with the base sheet 9. Then, the film 6 and the base sheet 9 are bonded together by the pressing rollers 11 and 12. Since the toner image 15' is sandwiched in between the base sheet 9 and the film 6, the process for fixing the image is dispensable. Of course it is possible to carry out the fixing treatment directly after the development. It is also possible to suitably select the temperature condition for the heat and pressure bonding in such a manner as to carry out the fixing treatment simultaneously with the bonding.

In the above first embodiment and its modifications, there have been obtained monochromic records. In the second embodiment described hereinafter there are obtained polychromic records.

Figure 4:
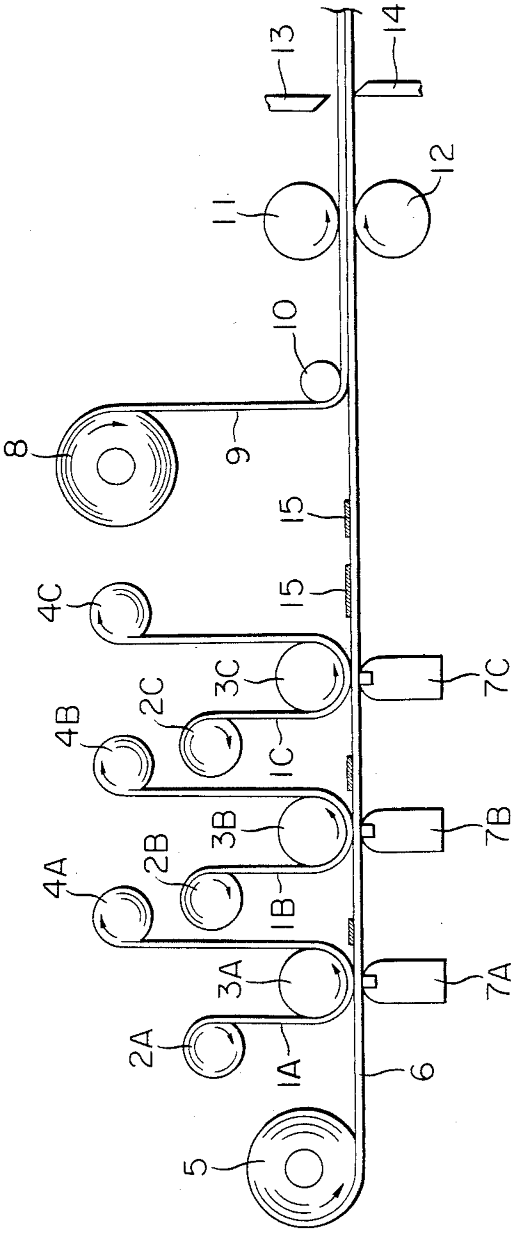
FIG. 4 shows a second embodiment of the invention.

In FIG. 4 showing the second embodiment, a film 6 as described above is supplied from a film supply drum 5. Along the running path of the film 6 there are arranged three different color recording parts, a cyan recording part, a magenta recording part and a yellow recording part at predetermined intervals.

The cyan recording part is constituted of an ink ribbon 1A coated with cyan ink, supply and take-up drums 2A and 4A, roller 3A and thermal head 7A. Similarly, the magenta recording part is constituted of an ink ribbon 1B coated with magenta ink, supply and take-up drums 2B and 4B, roller 3B and thermal head 7B, and the yellow recording part is constituted of an ink ribbon 1C coated with yellow ink, supply and take-up drums 2C and 4C, roller 3C and thermal head 7C. The thermal heads 7A, 7B and 7C are driven in synchronized relation with each other so as to make the cyan, magenta and yellow inks superimposed each other for the same image.

Other parts of the apparatus correspond to those of the apparatus shown in FIG. 1. According to the second embodiment, cyan ink image, magenta ink image and yellow ink image are superimposed each other to form a full color image. In this manner, any desired polychromic records can be obtained with the same advantages as described above.

Figure 5:
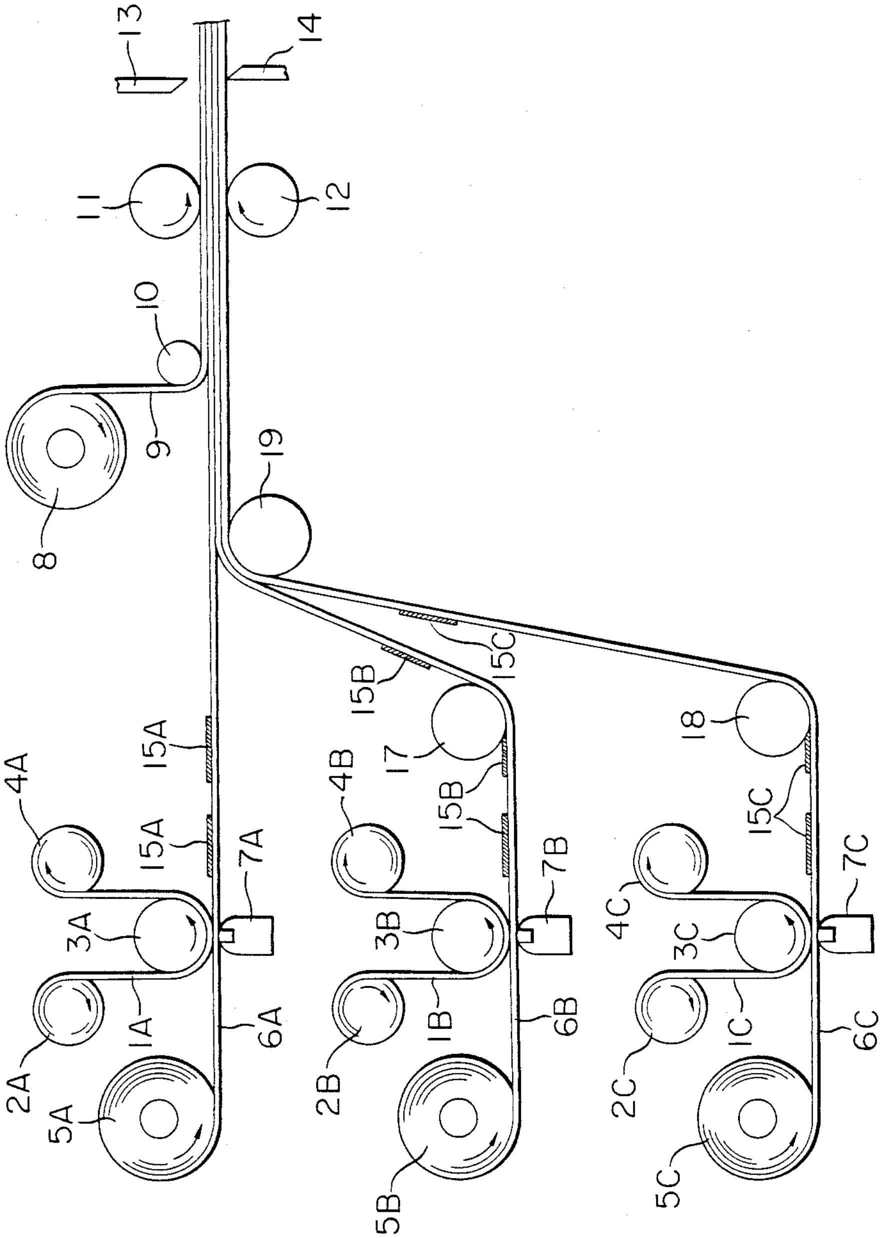
FIG. 5 shows a modification of the second embodiment.

FIG. 5 shows a modification of the second embodiment.

In this modification, a film for cyan 6A is fed from a film supply drum 5A, a film for magenta 6B is fed from a film supply drum 5B and a film for yellow 6C is fed from a film supply drum 5C. A cyan ink image 15A is formed on the film 6A by a cyan recording part 1A, 2A, 3A, 4A, 7A similar to that in FIG. 4. Similarly, a magenta ink image 15B is formed on the film 6B by a magenta recording part 1B, 2B, 3B, 4B, 7B and a yellow ink image 15C is formed on the film 6C by a yellow recording part 1C, 2C, 3C, 4C, 7C.

The films for magenta and yellow 6B and 6C are guided to a roller 19, passing about rollers 17 and 18 respectively. At the position of the roller 19, the film for cyan 6A is laid on the film for magenta 6B and the latter is on the film yellow 6C. Thus, the three film layers are superimposed. Further, a base sheet 9 is laid on the image side surface of the top film layer 6A. The superimposed four layers 6A, 6B, 6C and 9 together are pressed and heated by a pair of pressing rollers 11 and 12 containing a heat source. Thus, the superimposed four layers are bonded together.

The registration of cyan ink image, magenta ink image and yellow ink image for the same image may be attained in the following manners:

If the length of the film 6A extending from the thermal head 7A to the roller 19, the length of the film 6B from the thermal head 7B to the roller 19 and the length of the film 6C from the thermal head 7C to the roller 19 are all the same, then the registration can be attained by driving the three thermal heads 7A, 7B, 7C at the same time for the same image.

If the three films 6A, 6B, 6C are different from each other in the above length between thermal head and roller 19 as in the case shown in FIG. 5, the registration may be attained by suitably shifting the driving timing of the thermal heads 7A, 7B, 7C from each other according to the difference in the above length among the three films 6A, 6B, 6C.

In the above embodiment wherein the three films 6A, 6B, 6C are superimposed, if the laminated web comprising the three layers 6A, 6B, 6C has already a sufficient strength for handling of a hard copy, then the base sheet 9 may be omitted. However, in this case, the cyan ink image 15A on the film 6A will be exposed to the air. In order to avoid it, some change of the arrangement shown in FIG. 5 is needed. The positional relation between the cyan ink ribbon 1A and the thermal head 7A should be inverted so that the cyan ink image 15A can be formed on the lower side surface of the film 6A which contacts with the upper side surface of the film for magenta 6B. In addition, it is required that one of the outer films 6A and 6C should be a white or colored opaque film. In the hard copy obtained without using any base sheet 9, the films 6B and 6C serve also as a support for the film 6A on one hand and the films 6A and 6B serve also as a support for the film 6C. Further, if all of the three films 6A, 6B, 6C are transparent films, then there may be obtained a transparent positive like a slide suitable for observation by transmitted light. Such a transparent positive may be obtained also when a transparent plastic sheet is used as the base sheet 9.

In the second embodiment shown in FIGS. 4 and 5, again a halftone full color hard copy can be obtained by suitably controlling the amount of heat from the thermal heads 7A–7C.

Obviously, various modifications of the above embodiments are possible in the light of the above teachings. For example, while an ink ribbon 1 has been used as the ink bearing member in the above embodiments, there may be used also a drum having a layer of powdery ink adhering on the surface as disclosed in the aforementioned Japanese Laid Open Patent Application No. 82676/1980. Also, it is to be understood that the recording part is not limited to thermal or electrostatic recording systems as particularly shown in the above embodiments. All of those recording systems which enable forming an image through the step of transferring any image former onto a film may be employed for forming the recording part in the invention.

While in the embodiment shown in FIG. 4 or 5 there have been used three thermal heads 7A, 7B and 7C for high speed recording of polychromic images, it is also possible to use only a single thermal head for forming polychromic images according to the invention. In this case, to the single thermal head there are applied serially three different signals for forming a cyan image, a magenta image and a yellow image respectively. The ink ribbons 1A, 1B and 1C are also fed serially according to the sequence of the applied signals while reciprocating the film 6 three times per one picture area. Thus, the other two recording heads can be omitted.

The following third embodiment is a further improvement of the above second embodiment.

As seen from FIG. 5, the multilayer record composed of films 6A–6C has a correspondingly increased thickness. To reduce the thickness to a desirable value as a whole, it is required to make the respective films thinner. However, a thin film is apt to expand and shrink. If such thin films are superimposed, there occurs a relative shift of position between the films due to different expansion and shrinkage of the films, which brings about the problem that the three component color images get out of registration. The third embodiment solves the problem by giving to the individual color forming layers a suitable degree of adhesiveness.

Figure 6:
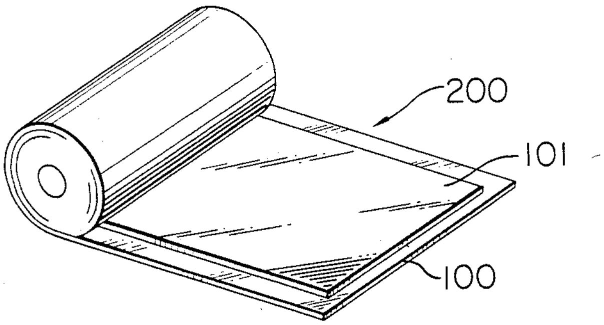
FIG. 6 is a perspective view of a heat sensitive color forming sheet used in the third embodiment of the invention.
Figure 7:
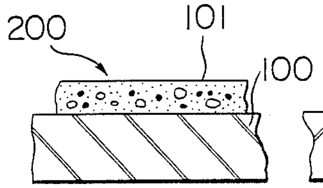
FIG. 7 is a cross-sectional view thereof showing the structure of the sheet in detail.

FIGS. 6 and 7 illustrate the structure of a heat sensitive color forming sheet used in the third embodiment.

The color forming sheet is constituted of a ribbon-like base sheet 100 and a color forming layer 101 adhered on the base sheet. The color forming layer 101 is easily stripable from the sheet 100. The base sheet 100 is made of a material from which the color forming layer can be easily peeled and which exhibits good thermal conductivity. A preferred example of the base sheet 100 is a paraffin paper or paper impregnated with wax having a thickness in the range of 10 to 20 μm or a high molecular weight film of several μm in thickness. The color forming layer 101 is transparent and adhesive at least at the upper surface area. The layer 101 is formed of a mixture of a coloring dye such as leucocompound and a coupler such as phenol pulverized and dispersed in a binder. The layer 101 develops a color when either one of the coloring dye and the coupler is melted by heat and contacts with the other. The coloring layer 101 has a thickness in the range of some μ to about 50μ. For the purpose of easy separation of the coloring layer 101 from the base sheet 100, the sheet 100 and the layer 101 are chosen so as to have a little difference in width therebetween.

Figure 8:
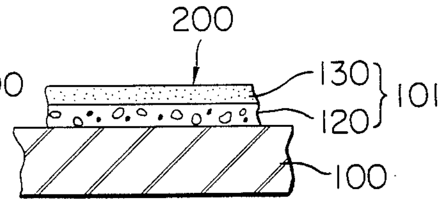
FIG. 8 is a similar cross-sectional view showing a modification of the heat sensitive color forming sheet.

Preferred examples of the binder used in the heat sensitive coloring sheet include polyvinylalcohol, hydroxyethyl cellulose, carboxymethyl cellulose or styrene maleic anhydride copolymer. In case the binder itself has a sufficiently high adhesiveness, the coloring sheet may be formed by simply applying a layer of the above described mixture onto a supporting sheet 100 as shown in FIG. 7. If the binder has no or insufficient adhesiveness, the coloring sheet may be formed by applying to the support member 100 at first a first layer 120 of the above mixture and then applying a second layer 130 of a highly adhesive binder on the first layer 120 as shown in FIG. 8.

To improve the thermal reactivity it is preferred that wax or the like be added to the binder in addition to the above mentioned coloring dye and coupler. Further it is recommendable that capsules containing fixing agent and crushable by pressure be added dispersed in the binder to improve the stability after coloring. As the fixing agent there may be used any known substance which is able to reduce the phenol and can not be colored before and after the reaction.

Figure 9:
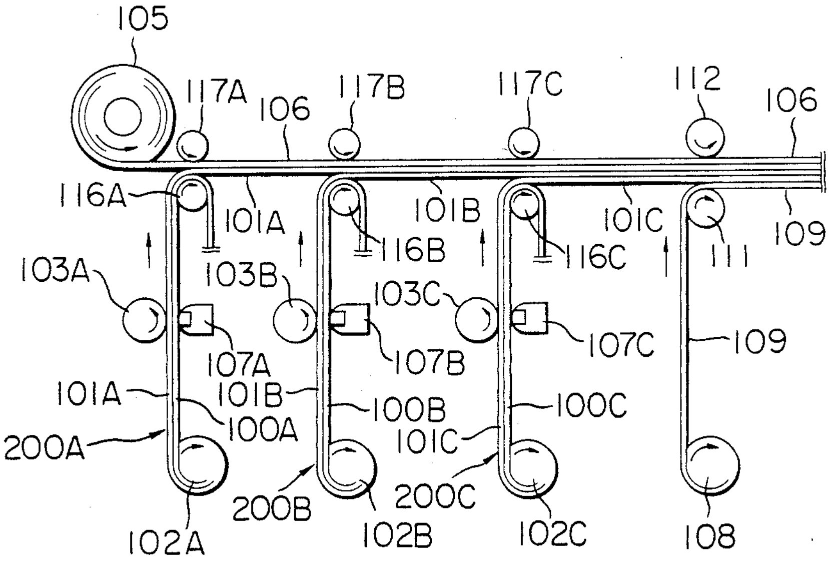
FIG. 9 is a schematic view showing a third embodiment of the invention.

FIG. 9 shows an embodiment of the color image forming apparatus employing the heat sensitive coloring sheets as shown in FIG. 6.

In FIG. 9, 200A, 200B and 200C are heat sensitive coloring sheets for developing yellow, magenta and cyan under the action of heat respectively. These three coloring sheets 200A, 200B and 200C are fed from supply drums 102A, 102B and 102C respectively and move in the direction of the arrow, passing between thermal heads 107A, 107B, 107C and rollers 103A, 103B, 103C respectively. The thermal heads 107A, 107B, 107C selectively heat the corresponding sheets. The heat reaches the coloring layer 101A through the supporting sheet 100A to form a monochromic image in the layer. Supplied from a supply drum 105 is a white or non-colored transparent base sheet 106. The heat sensitive coloring sheet 200A having a yellow image formed thereon enters the nip area between a pair of pressing rollers 116A and 117A where the coloring sheet 200A comes into contact with the base sheet 106 and the two sheets 200A and 106 are pressed together by the pressing rollers 116A, 117A. At the time, the coloring layer 101A firmly adheres to the base sheet 106 owing to the layer's own adhesiveness. Therefore, a strong bond is formed between the coloring layer and the base sheet. On the other hand, since, as previously noted, the coloring layer 101A is easily separable from the ribbon-shaped supporting sheet 100A and the bonding strength between the layer 101A and the supporting sheet 100A is preset sufficiently smaller than the bonding strength formed between the layer 101A and the base sheet 106, the supporting sheet 100A separates from the layer 101A after passing over the pressing roller 116A with deflection. The supporting sheet 100A apart from the coloring layer 101A is then taken up by a take-up drum not shown. Only the coloring layer 101A moves together with the base sheet 106 in a well bonded state.

Similarly to the above, a magenta image is formed on the heat sensitive coloring sheet 200B fed from the supply drum 102B and passed between the thermal head 107B and the roller 103B. When the sheet 200B passes through a pair of pressing rollers 116B and 117B, the coloring layer 101B having the magenta image thereon is bonded to the layer 101A already bonded on base sheet 106 and the supporting sheet 100B separates from the coloring layer 101B. The supporting sheet 100B apart from the coloring layer 101B is then taken up by a take-up drum not shown.

Also, on the heat sensitive coloring sheet 200C fed from the supply drum 102C there is formed a cyan image by the thermal head 107C. When it passes over the nip area of a pair of pressing rollers 116C and 117C, its coloring layer 101C having the cyan image thereon is bonded to the above coloring layer 101B supported on the base sheet 106. The supporting sheet 100C is separated from the coloring layer 101C and then taken up by a take-up drum not shown.

In this manner, three color images formed on the coloring layers 101A, 101B, 101C are superimposed on the same base sheet 106. Therefore, by applying to the three thermal heads 107A, 107B, 107C the corresponding control color signals in a synchronized relation, a natural color image can be obtained from the three monochromic images.

When the binder dispersed in the coloring layer 101 is sufficiently adhesive per se as in the case shown in FIG. 7, the coloring layer 101 becomes a layer of two-side adhesive. Therefore, in this case, the bonding strength between two coloring layers is very high. However, as will be understood from FIG. 9, the exposed surface of the undermost layer 101C is also adhesive, which is inconvenient for handling the record. To prevent it and protect the surface, in the shown embodiment, a non-colored transparent film 109 is supplied from a supply drum 108 to cover the exposed sticky surface of the layer 101C with the film 109 with the aid of a pair of pressing rollers 111 and 112.

If the binder dispersed in the first layer shown in FIG. 8 is not adhesive at all, then the exposed surface of the coloring layer 101C in FIG. 9 is not sticky and does not produce any problem. Therefore, in this case, it is unnecessary to cover the exposed surface with the transparent film 109. However, in any case, the rollers 103A, 103B, 103C disposed opposed to the thermal heads 107A, 107B, 107C should be covered, at least the roller circumferential surface, with a material to which adhesives can hardly adhere, for example, with a coating of fluororesin.

While the invention has been particularly shown and described with reference to preferred embodiments thereof, it will be understood by those skilled in the art that the foregoing and other changes in form and details can be made therein without departing from the spirit and scope of the invention.

We claim:

1. A method of forming a multi-color two-dimensional image on a base sheet, and in which recording head means generates a first picture signal representative of a first color monochromatic image component of said two-dimensional image and generates a second picture signal representative of a second color monochromatic image component of said two-dimensional image, the method comprising the steps of:

(a) moving a first film relative to said recording head means in the direction of a film plane of said first film to reproduce said first monochromatic image on said first film in accordance with said first picture signal from said recording head means;

(b) bonding one surface of said first film to said base sheet;

(c) moving a second, transparent film in synchronism with said first film and relative to said recording head means in the direction of a film plane of said second film to reproduce said second monochromatic image on said second film in accordance with said second picture signal from said recording head means; and (d) bonding said second film to the other surface of said first film and so that said first monochromatic image reproduced on said first film and said second monochromatic image reproduced on said second film are registered to produce said multi-color two-dimensional image.

2. A method according to claim 1, wherein said recording head means comprises a first head for generating said first picture signal and a second head for generating said second picture signal and wherein said first monochromatic image reproducing step includes a step for moving said first film relative to said first head and a step at which a first image former is adhesively applied to said first film in accordance with said first picture signal; and said second monochromatic image reproducing step includes a step for moving said second film relative to said second head and a step at which a second image former is adhesively applied to said second film in accordance with said second picture signal.

3. A method of forming a multi-color two-dimensional image on a base sheet, and in which recording head means generates a first picture signal representative of a first color monochromatic image component of said two-dimensional image and generates a second picture signal representative of a second color monochromatic image component of said two-dimensional image, the method comprising the steps of:

(a) moving a first transparent film relative to said recording head means in the direction of a film plane of said first film to reproduce said first monochromatic image on said first film in accordance with said first picture signal from said recording head means;

(b) bonding one surface of said first film to said base sheet;

(c) moving a second, transparent film in synchronism with said first film and relative to said recording head means in the direction of a film plane of said second film to reproduce said second monochromatic image on said second film in accordance with said second picture signal from said recording head means; and (d) bonding one surface of said second film to the other surface of said first film and so that said first monochromatic image reproduced on said first film and said second monochromatic image reproduced on said second film are registered to produce said multi-color two-dimensional image.

4. A multi-color image forming method according to claim 3, further comprising the step of bonding a third transparent film to the other surface of said second film.

5. An apparatus for forming a two-dimensional multicolor image on a base sheet, comprising:

(a) recording head means for generating a first picture signal representative of a first color monochromatic image component of said multi-color image and a second picture signal representative of a second color monochromatic image component of said multi-color image;

(b) a first and a second film, at least one of which is transparent;

(c) means for respectively moving said first and second films in synchronism and relative to said recording head means;

(d) means for reproducing said first monochromatic image on said first film in accordance with said first picture signal from said recording head means;

(e) means for reproducing said second monochromatic image on said second film in accordance with said second picture signal from said recording head means; and (f) means for bonding one surface of said first film to said base sheet and bonding said second film to the other surface of said first film, respectively, with said monochromatic images registered to form said multi-color image in a laminated structure.

6. An image forming apparatus according to claim 5, wherein said second film is transparent and said means for reproducing the second monochromatic image reproduces said second monochromatic image on one surface of said second film bonded to said first film.

7. An image forming apparatus according to claim 5, wherein said base sheet is opaque and said first and second films are both transparent, and said first and second monochromatic images are respectively reproduced on the surfaces of said first and second films opposed to said base sheet.

8. An apparatus for forming a two-dimensional multicolor image on a base sheet, comprising:

(a) recording head means for generating a first picture signal representative of a first color monochromatic image component of said multi-color image, a second picture signal representative of a second color monochromatic image component of said multi-color image and a third picture signal representative of a third color monochromatic image component of said multi-color image;

(b) a first, a second and a third film, at least two of which are transparent;

(c) means for respectively moving said first, second and third films in synchronism and relative to said recording head means;

(d) means for reproducing said first monochromatic image on said first film in accordance with said first picture signal from said recording head means;

(e) means for reproducing said second monochromatic image on said second film in accordance with said second picture signal from said recording head means;

(f) means for reproducing said third monochromatic image on said third film in accordance with said third picture signal from said recording head means, said third monochromatic image being reproduced on one surface of said third film; and (g) means for bonding one surface of said first film to said base sheet, one surface of said second film to the other surface of said first film and said one surface of said third film to the other surface of said second film, respectively, with said monochromatic images registered to form said multi-color image in a laminated structure.

* * * * *